Aug. 5, 1958    G. W. SCHNITZER    2,845,744
FISH LURE
Filed April 13, 1956
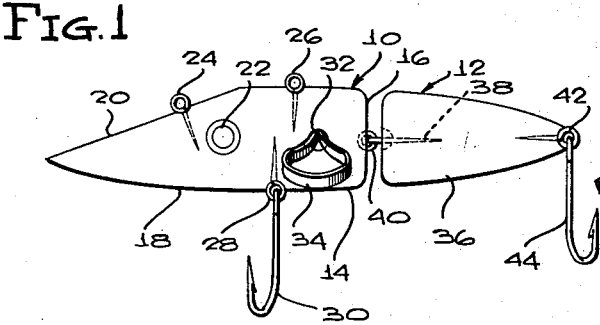
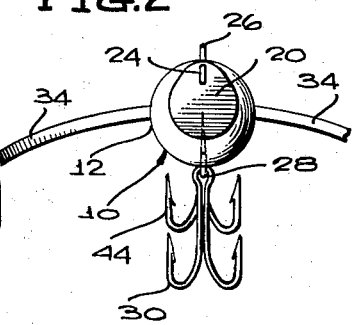
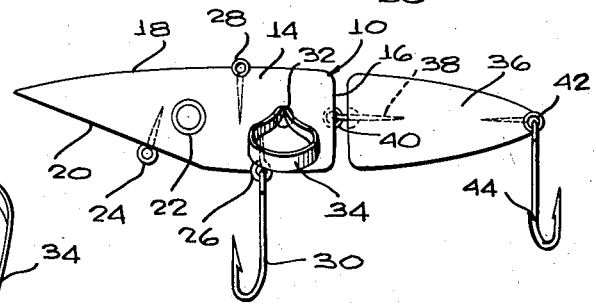
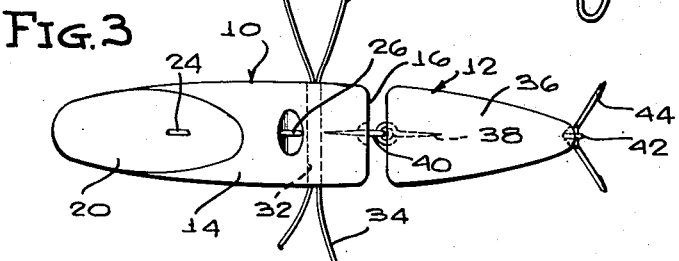
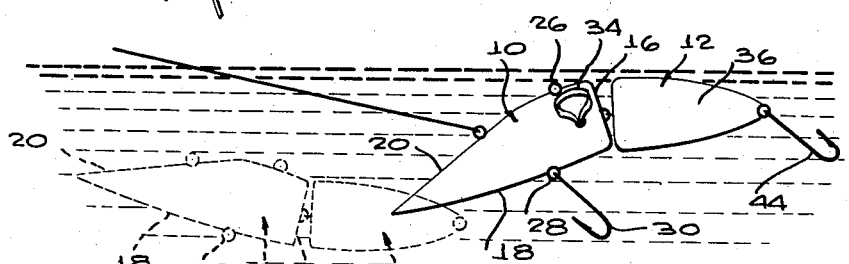
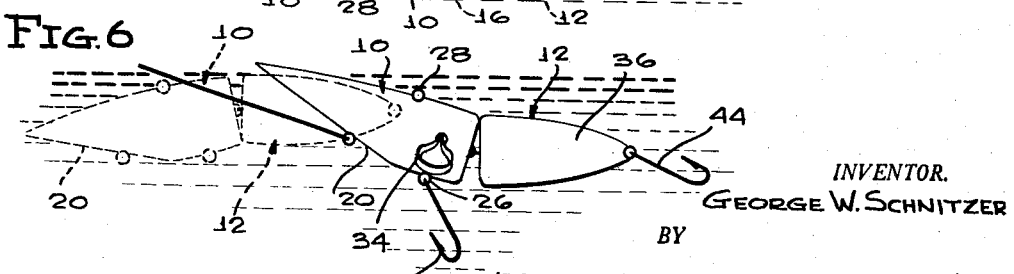
INVENTOR.
GEORGE W. SCHNITZER
BY
McMorrow, Berman + Davidson
ATTORNEYS

United States Patent Office 2,845,744
Patented Aug. 5, 1958

2,845,744

FISH LURE

George W. Schnitzer, Kansas City, Mo.

Application April 13, 1956, Serial No. 578,080

2 Claims. (Cl. 43—42.15)

This invention relates to fish lures, and more particularly has reference to a lure adapted to be converted from a diving to a surface lure, and vice versa.

The main object of the present invention is to provide a generally improved fish lure of the type indicated above, and the lure devised for the purpose of carrying out this object may be summarized briefly as follows:

The lure comprises a pair of sections, one leading and one trailing, the leading section simulating the head of a small fish and the trailing section simulating the tail portion of the fish. The sections are both adapted to be connected to hooks, and to this end, the leading section has eye screws at top and bottom thereof, with the eye screws of the leading section being adapted for selective connection to hooks. The leading section has a beveled nose providing a sloped face adapted to cause the lure to surface or dive, according to whether said face is faced upwardly or downwardly.

The retention of the lure in diving or surface-riding position is achieved by the selective connection of the hooks to one or the other of the eye screws of the leading section, that is, when the hook is connected to one of the eye screws, with the beveled nose facing downwardly, the hook depending from said section will form a drag or rudder element, that will prevent the lure from turning over, so that the lure will thus be a surface lure. When the hook of the leading section is connected to the diametrically opposed eye screw, that is, with the beveled nose faced upwardly the hook will again depend from the lead section, and under these circumstances will maintain the lure against axial rotation from the position in which its beveled nose is faced upwardly. The lure will now dive instead of skipping along the surface.

The trailing section also has a depending hook which tends to hold the trailing section from axial rotation, and a pivoted connection is provided between the leading and trailing sections, limiting the same against full rotation relative to one another, so that the trailing section and its associated depending hook cooperates with the depending hook of the leading section in holding the leading section against rotation from its diving or surface-riding position, as the case may be.

Among more specific objects of the invention are the following:

To provide a lure of the type described that will be manufactured at relatively low cost;

To improve the action of the lure, so that it will simulate with a high degree of faithfulness the movements of a bait fish, whether the lure is being used as a surface lure or, alternatively, as a diving lure;

To incorporate in the lure an arrangement wherein a conventional rubber band can be extended transversely therethrough with its ends projecting from opposite sides of the lure in a manner designed to simulate side fins on the fish;

To so articulate or joint the sections of the lure as to cause said sections to move relative to one another both at the crest and at the bottom of undulating movements of the lure, further to simulate the movements of the fish; and To permit the conversion of the lure to be effected speedily and easily, without the use of special tools.

Other objects will appear from the following description, the claims appended thereto, and from the annexed drawing, in which like reference characters designate like parts throughout the several views, and wherein:

Figure 1 is a side elevational view of a fish lure formed according to the present invention converted for use as a diving lure;

Figure 2 is a front elevational view thereof;

Figure 3 is a top plan view of the lure shown in Figure 1;

Figure 4 is a view similar to Figure 1 showing the lure converted for use as a surface lure;

Figure 5 is a view in which the lure is shown in full and dotted lines in different positions during use thereof as a diving lure; and Figure 6 is a view similar to Figure 5 wherein the lure is being employed as a surface lure.

Referring to the drawings in detail, the reference numerals 10, 12 respectively designate leading and trailing sections of the lure. These can be formed of solid material, such as plastic, wood, etc., suitably ornamented and configured to resemble a bait fish.

Considering first the construction of the leading section, this comprises an elongated body 14 slightly tapered from its intermediate portion toward the front and rear ends thereof as shown in Figures 1 and 3.

At its rear end, the body has a flat rear end surface 16 lying in a plane normal to the longitudinal center line of body 14.

The body further includes a side wall 18, tapered as previously described herein and at the leading end of body 14, the material of the body is cut away flatly in a plane disposed at a relatively small acute angle to the longitudinal center line of the body, to provide a beveled, forwardly facing surface 20. At opposite sides of the body, there may be provided, by painting or in any other suitable manner, eyes 22 simulating the eyes of the bait fish.

The surface 20 is of substantial length, extending from the leading extremity of the body to a location slightly rearward of the midlength point of the body as shown in Figure 1. Engaged in the surface 20, a short distance forwardly of the rear extremity of said surface, is an eye screw 24, to which is attachable a leader or fishing line.

Eye screws 26, 28 are secured to the body, rearwardly of the surface 20, at diametrically opposite locations upon the body, the eye 28 being faced slightly forwardly from the eye 26 as shown in Figures 1 and 4. The eyes 26, 28 lie in a common plane bisecting surface 20 longitudinally and centrally of said surface and perpendicularly intersecting the plane of the surface 20.

A hook 30 is connectable to either the eye 26 or the eye 28, and can be of any desired type. In the instant case, the hooks are of the double type, and can be attached to or detached from the selected eye by spreading of the shanks or legs of the hook, after which one or the other of said legs, and the hook portion integral therewith, is passed through said eye.

Formed in the body 14, slightly rearwardly of the hook 26, is a transverse opening 32, and extending through said opening is a conventional rubber band 34, the end portions of which project laterally, outwardly from the opposite sides of the body substantial distances, to simulate wings or fins on the bait fish.

The trailing section 12 includes a body 36, tapering from the forward to the rear extremity of said trailing section in continuation of the taper of the leading section as shown in Figure 3. The trailing section has a flat forward surface spaced rearwardly a short distance from surface 16, said surfaces engaging one another on relative pivotal movement of the sections 10, 12 as shown in Figures 5 and 6 to limit swinging movement of one section relative to the other.

Projecting forwardly from and fixedly engaged in the section 12 is an eye screw 38, loosely engaged with an eye screw 40 similarly projecting rearwardly from the end surace 16 of section 10. The eyes thus connect the sections for relative pivotal movement, and being fixedly engaged in their respective sections, limit rotatable movement of one section relative to the other about an axis extending longitudinally and centrally of each section, to less than 180 degrees.

Extending rearwardly from and fixedly engaged in the body 36 is an eye screw 42, to which is detachably connected a hook 44.

The device, in use, can be usable either as a surface or diving lure. Assuming that it is to be used as a diving lure, one would attach the hook 30 to the eye 28 as shown in Figures 1 and 5.

Under these circumstances, the hook 30 will constitute a depending drag, tending to retain the leading section 14 in a position, when the lure is drawn through the water, in which the beveled surface 20 faces upwardly. The hook 44 cooperates with hook 30 in this respect, since the hook 44 also constitutes a depending drag, and the connection of the leading and trailing sections is such that the leading section cannot rotate through 180 degrees relative to the trailing section.

At the same time, however, the sections are pivotally connected for relative pivotal movement about a transverse axis between the full and dotted line positions shown in Figure 5.

Thus, when the lure is drawn through the water, it will tend to dive, and when it has dived to an extent such that it can no longer dive against the pull of the leader or fishing line, it will turn upwardly as shown in dotted lines in Figure 5. When it has turned upwardly to an extent such that it is free to dive once again, the water, deflected upwardly by the surface 20, will again cause the diving movement. Thus, the lure will have an undulating movement in the water, traveling upwardly and downwardly, while always tending to dive to a predetermined depth.

If the lure is to be used as a surface lure, so that it will effect leap slightly above the surface of the water and skip along said surface, the hook 30 is detached, and is connected to the eye screw 26. The hook 30 will now provide a drag, cooperating with the hook 44, to hold the lure against substantial rotation about its longitudinal axis from a position in which the surface 20 faces downwardly.

Under these circumstances, water deflected by the surface 20 will travel downwardly, causing the lure to continually rise to the surface. The lure thus skips along the surface, and each time it rises to and skips slightly above the surface, it will drop back to the surface and the sections, pivoting about their transverse axis, will now move slightly below the surface before rising once again.

Thus, it will be seen that merely by engagement of the hook 30 with a selected one of the eyes 26, 28, the lure is readily converted from a diving surface lure and vice versa. The construction, further, has a desirable characteristic wherein the lure is retained in the selected position thereof by reason of the fact that the hooks 30, 44, cooperating with the particular pivotal connection of the sections to one another, serve as drags or depending weights, stabilizing the lure against rotation about its long axis. Still further, the use of the rubber band provides a highly effective, simple manner of providing fins or wings on the lure, which wings will flex in a manner simulating to a high degree the movements of the side fins of a big fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A lure comprising leading and trailing sections so shaped as to simulate, together, a bait fish; means connecting the sections in end-to-end relation for relative pivotal movement about an axis extending transversely of the sections, and for relative rotatable movement about an axis extending longitudinally of the sections, said means limiting each section to rotation relative to the other section through slightly less than 180 degrees of a circle, the leading section having a surface at its forward end extending in length substantially more than half the length of the leading section and lying in a plane oblique to the longitudinal center line of the leading section to provide a water deflecting surface said surface forming on the leading section diametrically opposed, hook-supporting, longitudinal surfaces one of which is substantially longer than the other; eye screws disposed in a common plane perpendicularly intersecting the first plane at diametrically opposite locations on the leading section said eye screws being engaged in the respective hook-support surfaces, the eye screw in said one hook-support surface being spaced slightly in advance of the eye screw in the other hook-support surface in a direction longitudinally of the leading section; a hook selectively engageable with a selected one of said eye screws to depend from the leading section with the leading section in a position in which said surface is faced in a selected direction, said hook forming a drag tending to hold the leading section against rotation from said position about an axis extending longitudinally of the leading section; a hook depending from the trailing section to provide a drag cooperating with the first hook in holding the leading section against rotation from said position; and flexible wings projecting in a direction laterally outwardly, from opposite sides of the leading section and angularly spaced from the drag of the leading section 90 degrees at opposite sides thereof, the wings being elongated in said direction to an extent such that each of the wings is of a length substantially greater than the width of the leading section, whereby to define weight-like elements well outwardly from the sides of the leading section cooperating with the hook of the leading section in holding the leading section against rotation from said position said wings being disposed approximately abreast of said eye screws.

2. An articulated fishing plug comprising: leading and trailing body sections having the general shape of the head and tail portions, respectively, of a bait fish, the leading section having a slight taper from a location intermediate its ends toward its leading and trailing ends, the lead section extending over the major part of the length of the plug, said sections having flat, confronting end surfaces in planes normal to the lengths of the respective sections, the leading section having a flat, beveled, forwardly facing surface at its front end the length of which extends from the leading extremity of the leading section through the major part of the length of the leading section, the taper between said leading end and said location being extended the full length of and beyond the rear end of said beveled surface; eyes on said leading section angularly spaced apart 180 degrees circumferentially of the leading section, said eyes being spaced rearwardly from said rear end of said surface, both eyes lying in a plane longitudinally bisecting the leading section and perpendicularly intersecting the plane of said surface; a front hook detachably connectable to a selected one of said eyes and forming a drag depending from the leading section and tending to stabilize the same against rotation about its long axis; a pair of diametrically opposed, flexible wings projecting laterally outwardly from the leading section rearwardly from the rear end of said surface, said wings comprising stabilizing fins angularly spaced 90 degrees circumferentially of the leading section from the respective eyes; a connection between the sections extending across the space between the leading and trailing sections and joining said sections for relative rotation about axes extending longitudinally and transversely of the plug; a rear hook connected to the trailing extremity of the trailing section; and an eye projecting from said surface for connecting a line thereto.

References Cited in the file of this patent

UNITED STATES PATENTS

| | | |
|---|---|---|
| 1,230,968 | Wilbur et al. | June 26, 1917 |
| 1,394,313 | Leeper | Oct. 18, 1921 |
| 1,545,683 | Nowak | July 14, 1925 |
| 1,569,993 | MacLeod | Jan. 19, 1926 |
| 1,599,763 | Head | Sept. 14, 1926 |
| 1,842,591 | Dunkelberger | Jan. 26, 1932 |
| 1,940,907 | Edwards | Dec. 26, 1933 |
| 2,437,549 | Percher | Mar. 9, 1948 |
| 2,559,169 | Pemberton | July 3, 1951 |
| 2,606,388 | Croft | Aug. 21, 1952 |
| 2,633,660 | Ray | Apr. 7, 1953 |
| 2,700,239 | Ellis | Jan. 25, 1955 |
| 2,789,385 | Seeger | Apr. 23, 1957 |
| 2,793,460 | Mutchler | May 28, 1957 |